(12) United States Patent
Andre et al.

(10) Patent No.: US 8,159,905 B2
(45) Date of Patent: Apr. 17, 2012

(54) PORTABLE TELEPHONE PROVIDED WITH A MECHANICAL WATCH

(75) Inventors: Romaric Andre, Paris (FR); Thomas Pruvot, Paris (FR); Olivier Poirot, Paris (FR)

(73) Assignee: Celsius X VI II, Paris (FR)

( * ) Notice: Subject to any disclaimer, the term of this patent is extended or adjusted under 35 U.S.C. 154(b) by 175 days.

(21) Appl. No.: 12/675,261

(22) PCT Filed: Sep. 1, 2008

(86) PCT No.: PCT/FR2008/051554
§ 371 (c)(1),
(2), (4) Date: Feb. 25, 2010

(87) PCT Pub. No.: WO2009/044027
PCT Pub. Date: Apr. 9, 2009

(65) Prior Publication Data
US 2010/0302911 A1    Dec. 2, 2010

(30) Foreign Application Priority Data

Aug. 30, 2007  (FR) ...................... 07 57256

(51) Int. Cl.
*G04B 3/00* (2006.01)
*G04B 47/02* (2006.01)
*H04M 1/00* (2006.01)

(52) U.S. Cl. ..... 368/13; 368/206; 379/433.1; 455/556.1

(58) Field of Classification Search ............ 368/10, 368/13, 64, 147, 148, 206–208; 371/433.1; 455/344, 556.1, 575.6
See application file for complete search history.

(56) References Cited

U.S. PATENT DOCUMENTS

| 2,876,617 A | 3/1959 | Canning et al. |
| 6,424,600 B1 * | 7/2002 | Okeya et al. ............... 368/204 |
| 6,603,236 B2 * | 8/2003 | Nagasaka ............... 310/261.1 |
| 2003/0002392 A1 * | 1/2003 | Klein et al. ............... 368/184 |
| 2008/0247278 A1 * | 10/2008 | Walker et al. ............... 368/206 |

FOREIGN PATENT DOCUMENTS

| CH | 138 641 | 3/1930 |
| CH | 144 356 | 12/1930 |
| DE | 18 73 094 | 5/1963 |
| EP | 1 388 778 | 2/2004 |
| FR | 717 902 | 1/1932 |
| FR | 752 441 | 9/1933 |
| GB | 371 730 | 4/1932 |

OTHER PUBLICATIONS

French Search Report in Corresponding Application No. FA 697224/FR 0757256 May 9, 2008.
International Search Report dated Apr. 7, 2009, from corresponding PCT application.

* cited by examiner

*Primary Examiner* — Vit Miska
(74) *Attorney, Agent, or Firm* — Young & Thompson

(57) ABSTRACT

Portable device, of all types, comprising a watch (1) with mechanical winding, characterized in that a mechanical device doing away with the need for the user to manually wind, uses the power of kinetic energy provided with simple actions making up normal usage of the device in order to carry out mechanical winding of the watch (1).

21 Claims, 11 Drawing Sheets

FIG.4a
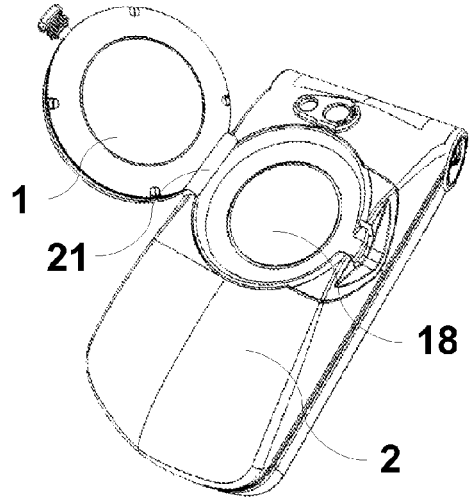
FIG.4b
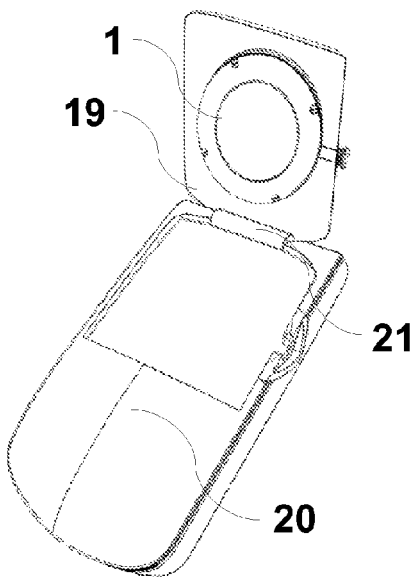
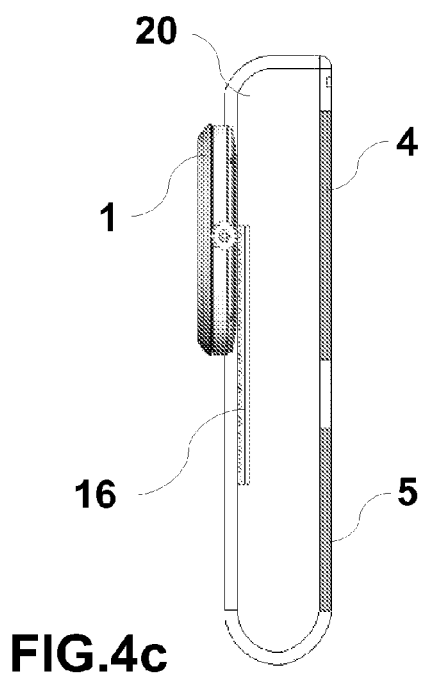
FIG.4c
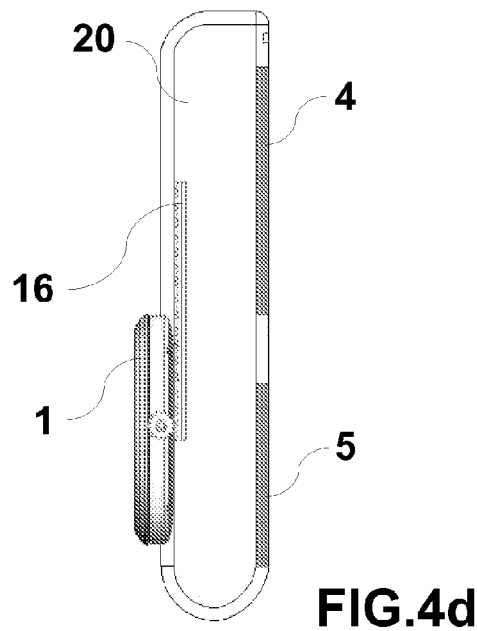
FIG.4d

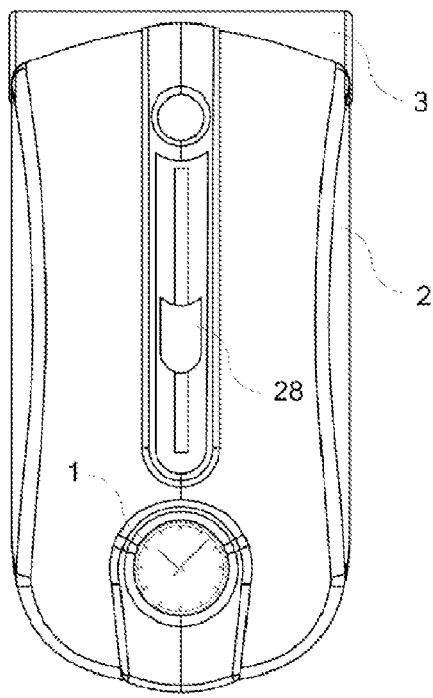
FIG. 6a
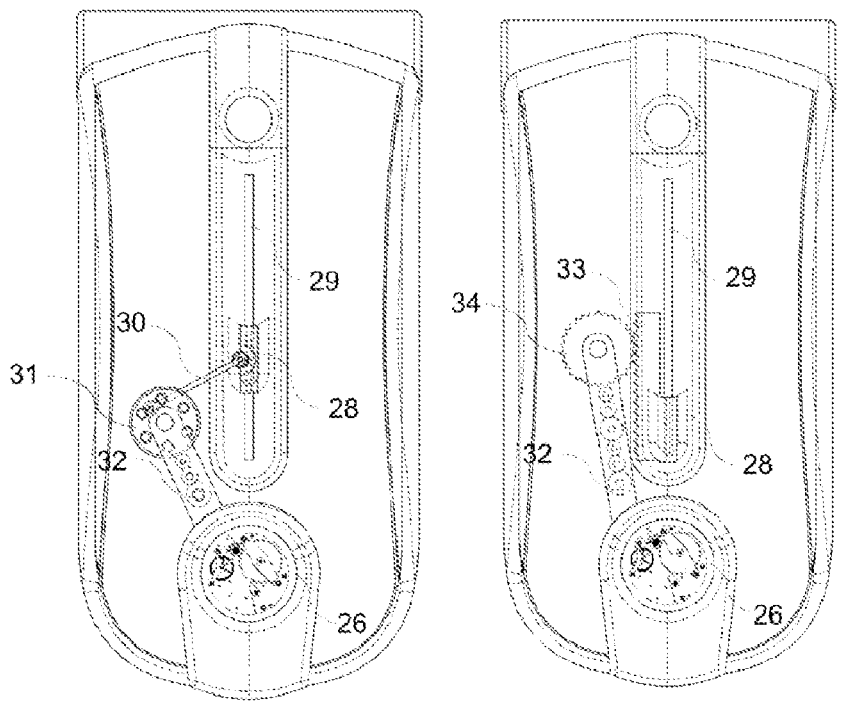
FIG. 6b  FIG. 6c

PORTABLE TELEPHONE PROVIDED WITH A MECHANICAL WATCH

BACKGROUND OF THE INVENTION

1. Field of the Invention

The invention relates to a portable apparatus including a mobile telephone functionality and which is provided with a mechanical watch.

2. Description of the Related Art

The apparatuses to which the invention relates are electronic communication apparatuses of the portable type which permit, in particular, a user to telephone in various locations.

They are, for example, portable telephones, personal digital assistants (for example of the Blackberry type, which is a registered trademark), mini computers . . . .

Such portable apparatuses are used by a large proportion of the population and are provided with numerous functionalities. Over the last few years progress in the miniaturisation of electronic components has permitted the inclusion of cameras, video cameras, MP3 players, GPS or compact keypads permitting the typing of messages and Internet use.

As with other electronic apparatuses the owners of portable apparatuses are more and more frequently looking for aesthetic and functional features which appeal to them. There is thus an observable tendency in users to desire to personalise and customise their portable apparatus by the choice of different ringtones, wallpaper, functionalities, colour or design.

Although most portable apparatuses permit the time to be displayed (in various formats) on their screens, there is a desire among some users for a portable apparatus having a traditional mechanical watch, a symbol of elegance and prestige, which can be checked at any time, operating in a fully stand-alone manner, thus enabling it to operate whether the portable apparatus is switched on, off or is even in a discharged state.

This assembly comprising a portable apparatus provided with a mobile telephone functionality and associated with a watch necessitates a particular configuration in the arrangement of the portable telephone to accommodate the considerable size of the watch and poses a specific problem for the winding of the traditional watch mechanism.

Indeed, although it must remain possible for the watch still to be wound up by hand, it would be generally preferable for the user of such an apparatus provided with a prestige watch to be able to forego this operation which is constraining and is often forgotten (which inevitably means that the watch will be wrong). A particular technical solution bringing together aesthetic and practical considerations therefore needs to be sought.

SUMMARY OF THE INVENTION

A purpose of the invention is thus to overcome this difficulty by proposing an innovative object resulting from a combination of a watch and a portable apparatus, of any type, characterised in that normal usage of the said apparatus permits the watch to be wound mechanically.

The invention thus proposes that, in addition to its traditional manual winding which is still possible, the mechanical watch can be wound by exploiting the potentialities of the kinetic energy involved during simple actions inherent to normal usage of the apparatus.

This type of action does not include the simple displacement of the portable apparatus, for example when it is being carried by its owner.

The object of the invention is more particularly a portable apparatus having a mobile telephone function and having at least one watch, characterised in that it has a mechanism for mechanical winding of the watch, at least one element which can move with respect to the apparatus and which is connected to the mechanical winding mechanism by a mechanical device for transmission of movement, the kinetic energy involved during displacement of the said at least one moveable element being communicated to the mechanical winding mechanism of the watch via the mechanical device for transmission of movement.

The actuation by the user of at least one moveable element of the apparatus causes it to be displaced from a first position to a second position.

This displacement transfers the kinetic energy to the mechanical winding mechanism of the watch via the mechanical device for transmission of movement and thus permits the spring of the calibre of the watch to be compressed.

According to one feature the displacement of the said at least one moveable element is effected during one or a plurality of actions inherent to usage of the apparatus.

Thus when using the apparatus, for example when implementing one of its functionalities, the user transmits to the apparatus the energy which will serve to wind the watch integrated into the apparatus.

Thus the unfolding of a flap, the opening of a battery compartment cover, the sliding of the screen or access to a specific function by sliding or pivoting the watch are, for example, just actions occurring during normal use of the portable apparatus offering a usable mechanical energy potential. For example, an oscillating mass system which is well known in horology, or a gear train or belt system makes it possible to exploit these actions to provide the energy required for mechanical winding of the watch.

The present invention can be adapted to all types of portable apparatuses including a telephone function (telephones, personal digital assistants, mini computers . . . ), for example those formed in two parts articulated about an axis of rotation, able to fold one onto the other (hereinafter referred to as a "flip phone") or those in two parts which slide in two parallel planes (hereinafter referred to as a "slide phone"). In addition to these "dual body" mobile phones, the present invention can also be adapted to "mono body" mobile phones, also called "block phones".

Generally speaking, the watch can thus be fixed on one of the two flaps of a flip phone apparatus, or fixed to one of the two parts of a slide phone apparatus, or even mounted so as to be able to pivot or slide, on all types of portable apparatuses, to uncover a screen, a battery pack or subjacent functionalities.

The portable apparatus provided with a watch in accordance with the invention has the advantage of an elegant appearance with the inclusion of a traditional mechanical watch, without the ongoing constraint of manual winding of the watch mechanism.

Depending on the different models of portable apparatuses, the invention is characterised in that the winding mechanism is actuated during an ordinary or conventional movement or one which is concomitant with normal usage of the apparatus. According to the possible exemplified embodiments of the invention, this movement thus involves either the action of a gear train (or series of belts, or a hinge, or rack, etc.) or the displacement of an oscillating mass, these different events being mechanically optimised to permit the watch to be wound.

The great diversity of possible aesthetic embodiments of this "portable apparatus—watch" assembly which, in accordance with the invention, has mechanical winding initiated by an ordinary action, is a definitive advantage with respect to the personalisation of this apparatus and for the design of up-market portable apparatuses. In accordance with the invention, the winding mechanism and the positioning of the watch can vary, thus leading to a number of embodiments.

According to one embodiment the apparatus has two parts which can fold one onto the other and of which one carries the watch, the opening of the apparatus taking place about an axis of rotation which forms part of the movement transmission device.

According to another embodiment, the apparatus has two parts which can move with respect to each other in two parallel planes and of which one carries the watch, the winding mechanism of the watch being actuated during sliding of the two moveable parts with respect to each other.

According to a feature linked to this embodiment, the winding mechanism is actuated by means of the movement transmission device comprising a gear train rotationally driven by the displacement of a rack carried by one of the parts of the apparatus.

Thus the watch is, for example, carried by one of the two parts of the apparatus, while the rack is carried by the other part.

The gear train is, for example, arranged in the part carrying the watch.

According to another embodiment the watch is displaced alone in a pivoting or translational manner with respect to the entire apparatus.

In this case the watch is displaced independently of the rest of the apparatus.

In accordance with one feature linked to this embodiment the displacement of the watch is exploited mechanically to contribute to the winding of the watch via the mechanical device for transmission of movement associated with a hinge permitting the said displacement of the watch.

The watch is thus displaced by pivoting about an articulation.

In accordance with another feature linked to this embodiment the displacement of the watch makes it possible to reveal an external screen, a battery pack or any other subjacent display screen linked to a telephone functionality or to a functionality useful for the apparatus as a portable apparatus, for example a battery charge indicator or indicator of connection to a mobile telephone communication network.

In accordance with another feature linked to this embodiment the displacement of the watch makes it possible to reveal a functionality which is not useful in telephony, within the cavity in which the watch is folded, for example a compass, a photograph or an item which has been personalised by engraving.

In accordance with another feature linked to this embodiment the apparatus has two parts which can move with respect to each other, the independent displacement of the watch permitting access to a portion of the moveable part located under the watch and on which it is not articulated, without it being necessary to open the portable apparatus, for example by unfolding it or by sliding one of the parts.

In accordance with another embodiment, the mechanism for winding the watch is actuated when the said at least one moveable element is being moved into the open configuration, whether this involves, for example, the opening of the apparatus, of a flap, the unfolding or sliding of the watch, but is disengaged when the said at least one moveable element is being moved into the closed configuration.

In accordance with one variation the mechanism for winding the watch is actuated upon passage from the "open configuration" of the apparatus to the "closed configuration".

More time is generally available when the apparatus is being closed than when it is being opened, and this additional time can be exploited to improve the mechanical winding of the watch.

In accordance with a still further embodiment, the apparatus has two parts which can fold one onto the other, the movement transmission device having a linear and free mass system transferring the kinetic energy involved during each movement of one part to the mechanism for winding the calibre.

It will be noted that the free mass, the transmission device and the watch are, for example, integrated into a single part which is, for instance, that forming the upper part of the apparatus.

The freely moving mass, integrated into a moveable element of the apparatus, is driven in a predetermined displacement, linear or otherwise, with respect to the element when the user actuates/displaces this moveable element.

In accordance with one feature, the movement transmission device comprises an oscillating mass system transferring the kinetic energy of each displacement of the said at least one moveable element of the apparatus to the mechanism for winding the calibre.

In accordance with this feature, the free mass is driven in an oscillating movement during the actuation/displacement of the moveable element. The moveable element is, for example, one of the constituent parts of the apparatus, and one which is displaced in order to open the apparatus. This displacement is, for example, a pivoting movement about an articulation forming a hinge.

In accordance with one feature, the oscillating mass is weighted and the arm extends outside the zone of the apparatus where the watch is arranged.

By exploiting the volume of the apparatus around the watch, the arm connecting the mass to the winding mechanism can be extended with respect to the traditional arrangements known in horology.

It follows that the larger lever arm makes it possible to gain mechanical torque during oscillations and thus to improve the performance of the mechanical winding.

In accordance with another feature, the oscillating mass is placed laterally with respect to the watch calibre in order to limit the thickness of the apparatus fitted with the device.

By thus arranging the mass laterally the bulk produced by this additional device is reduced.

In this way the apparatus thus equipped respects the volume constraints to which this type of portable apparatus are subjected.

In accordance with another embodiment, the apparatus has two parts which can fold one onto the other and of which one carries the watch, the movement transmission device having a system for full rotation of the calibre, transferring the kinetic energy used during each movement of one part to the mechanism for winding the calibre.

In this embodiment the entire watch is involved in its winding.

More particularly, the actuation/displacement of the moveable part of the apparatus which carries the watch causes this latter to pivot.

It will be noted that when the moveable part of the apparatus is displaced, for example, by pivoting about an articulation forming a hinge, a new spatial orientation is thus conferred to the watch.

In addition to the mechanical winding, the rotation of the watch associated with the displacement of the moveable part of the apparatus facilitates reading of the time display.

For example, the watch is carried by the flap-forming foldable upper part.

In accordance with another embodiment, the apparatus has one or a plurality of rotationally moveable thumbwheels connected to the movement transmission device in order to wind the mechanical watch.

The simple actuation of a thumbwheel arranged on any of the faces of the apparatus thus makes it possible to wind (compression of spring(s)) the watch. A thumbwheel such as this, used in a known manner on this type of apparatus, acts as a member and serves, for example, to displace a cursor on the screen of the apparatus.

In accordance with another embodiment, the apparatus has one or a plurality of keypad keys, the depression of which is converted into a rotational movement by the movement transmission device in order to wind the mechanical watch.

The simple pressure exerted on one or more keys of the keypad of the apparatus thus makes it possible to wind the watch.

In accordance with a feature linked to one or the other of the two preceding embodiments, the movement transmission device has a system of gears.

In accordance with a feature not linked to any particular embodiment, the apparatus has a mechanism for disengaging the winding mechanism when winding has been effected fully.

This additional arrangement makes it possible to use the apparatus in a normal manner (i.e. by undertaking the same actions as before the watch was wound) once the watch is wound (and the spring(s) of the mechanism have been compressed).

BRIEF DESCRIPTION OF THE DRAWING FIGURES

Other features and advantages of the invention will become clear from the following description taken with the attached drawings which are given only by way of non-limiting examples.

FIGS. 4a to 4d illustrate three possible arrangements of the watch in other advantageous embodiments of the invention where the watch pivots or slides freely with respect to the entire telephone. FIGS. 4a and 4b respectively show a watch placed on the upper flap of a flip phone and a watch fixed to the battery compartment cover on the back of a block phone. FIGS. 4c and 4d show—in a top and then bottom configuration—a watch sliding independently of the rest of the phone on the back of a block telephone.

Figure 5A:
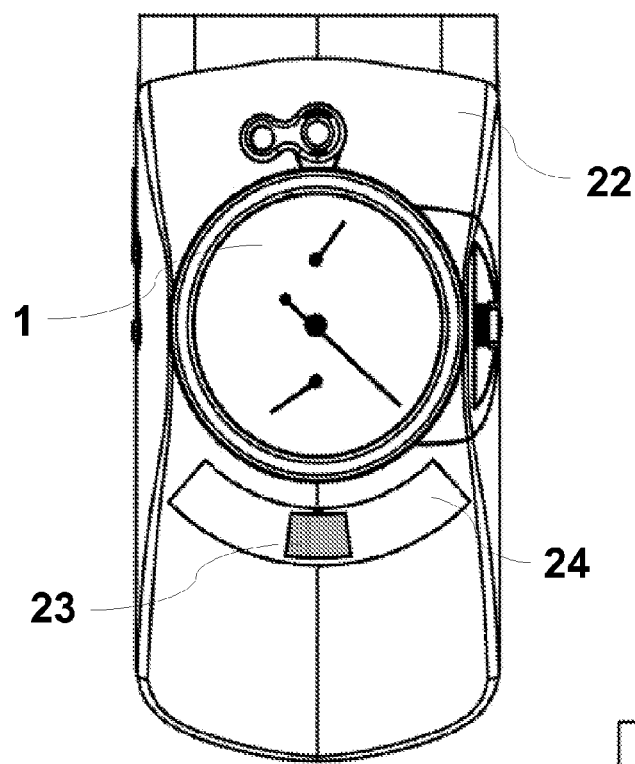
Figure 5B:
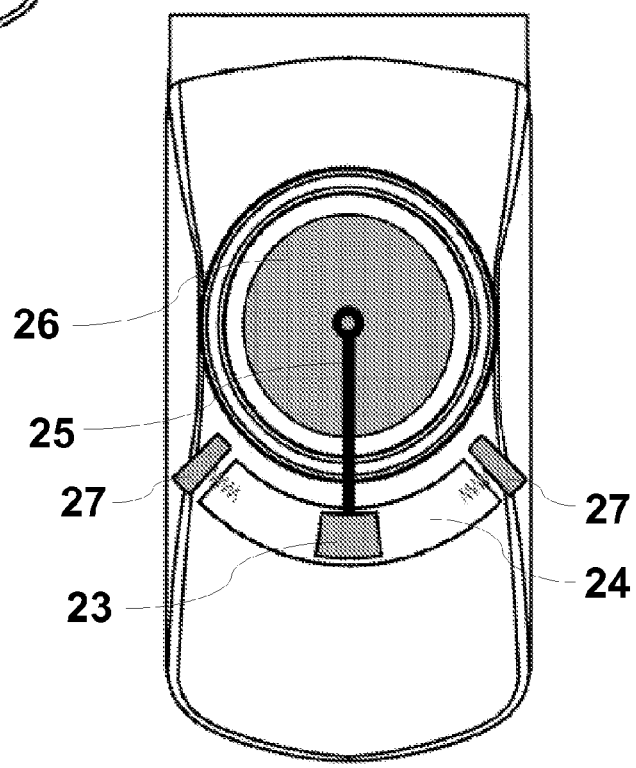

FIGS. 5a and 5b illustrate in a front view and then in an internal cut-away view the device composed of a mechanical watch and its oscillating mass permitting it to be wound, preferably placed on the upper flap of a flip phone.

FIGS. 6a to 6c illustrate an embodiment of a telephone provided with a watch which is wound using the displacement of a free mass.

FIGS. 7a to 7d illustrate an embodiment of a telephone provided with a watch which is wound using the rotation of a thumbwheel.

Figure 8A:
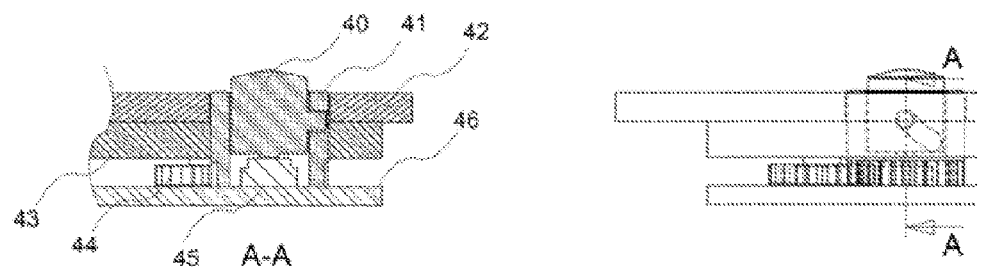
Figure 8B:
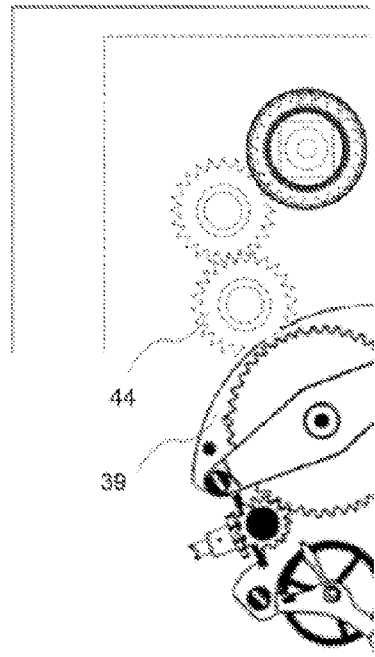
Figure 8B:
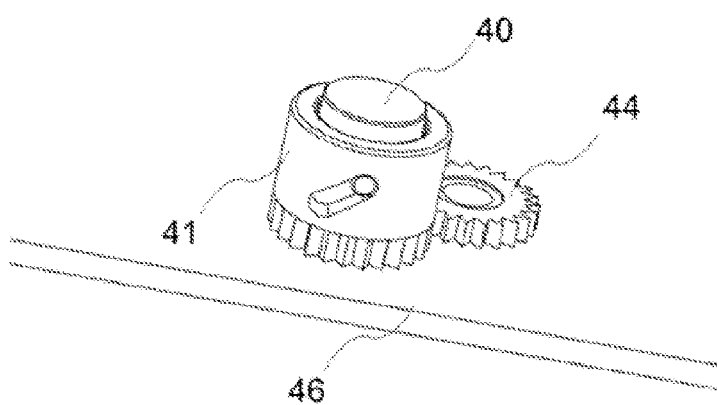

FIGS. 8a and 8b show an embodiment of a telephone provided with a watch which is wound using displacement by pressing in a keypad key.

Figure 9A:
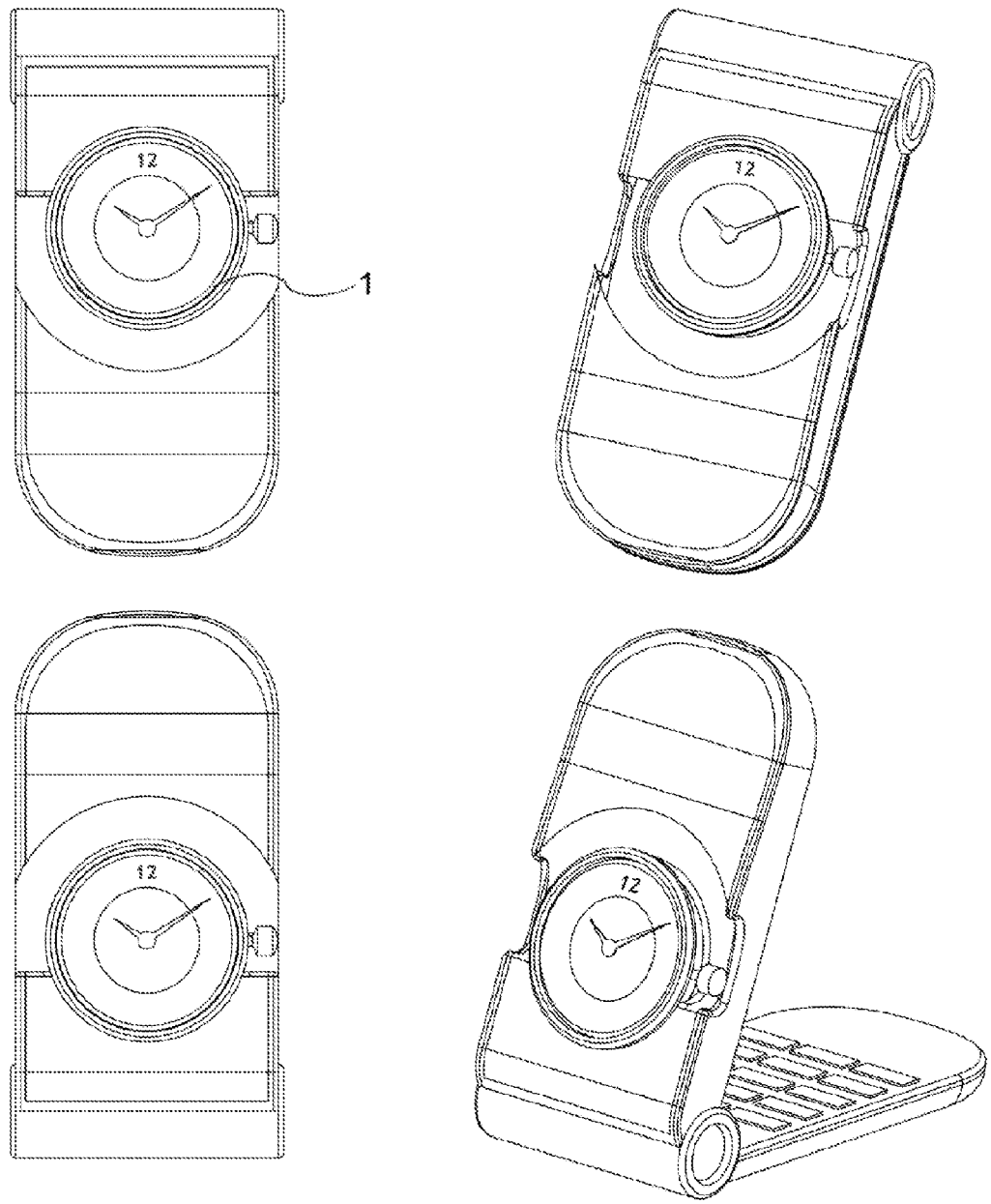
Figure 9B:
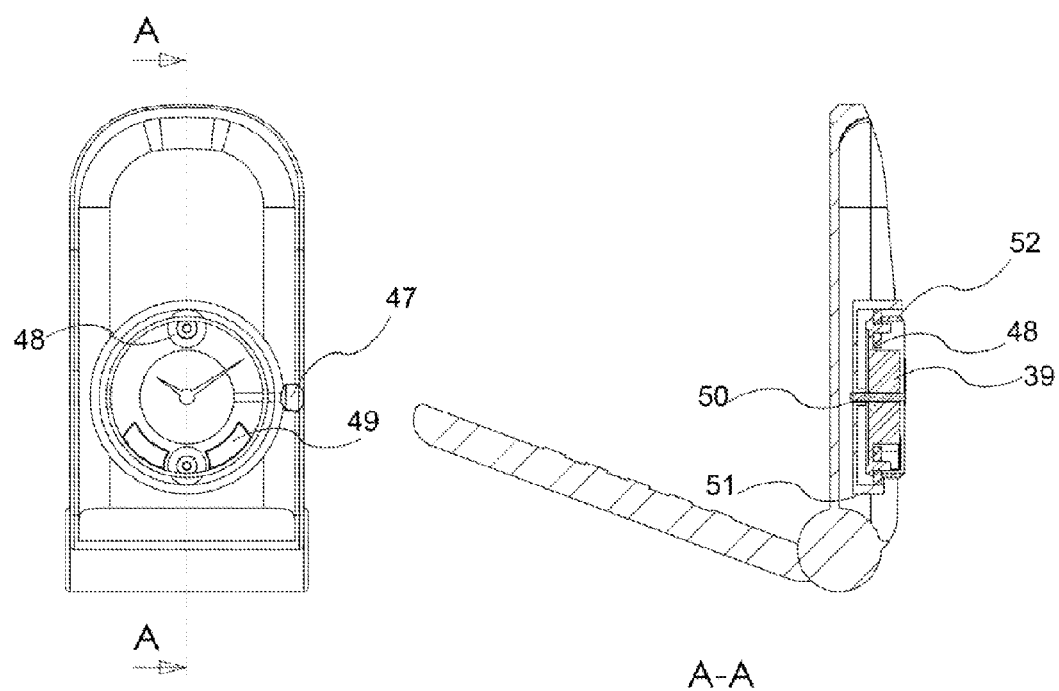
Figure 9C:
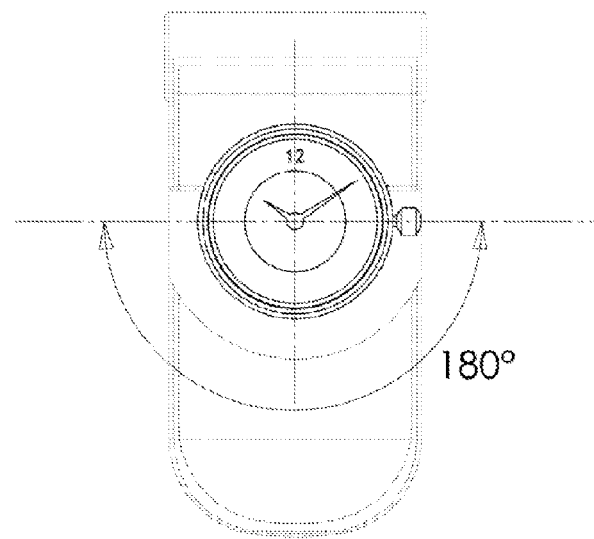

FIGS. 9a to 9c illustrate an embodiment of a telephone having a watch which is wound by the pivoting of the watch itself and which is caused by the displacement of the part of the telephone incorporating the watch.

Figure 10A:
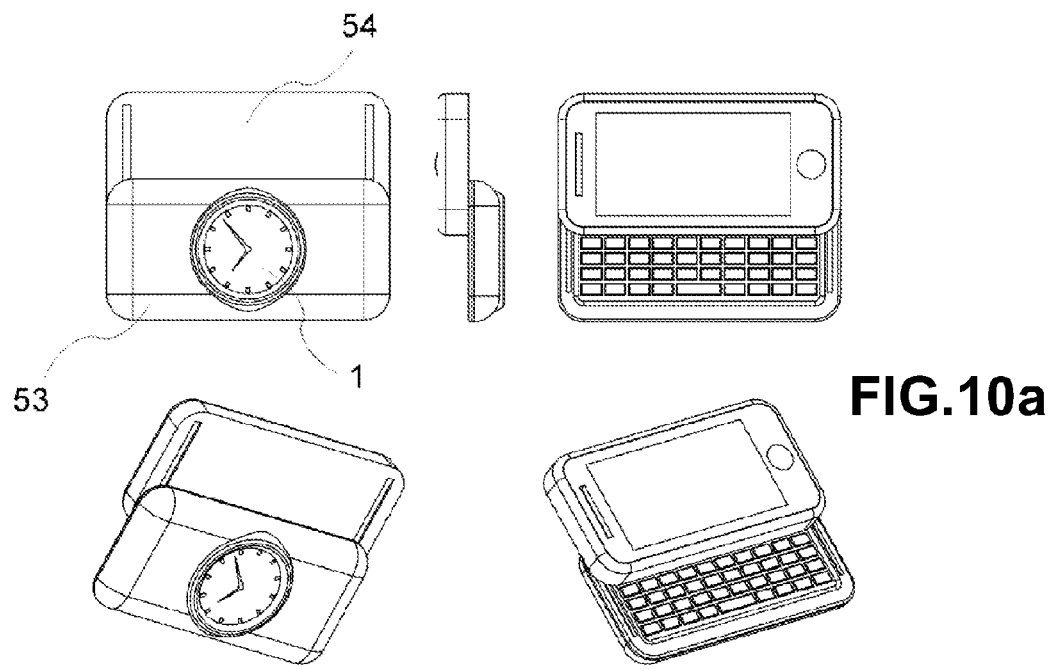
Figure 10B:
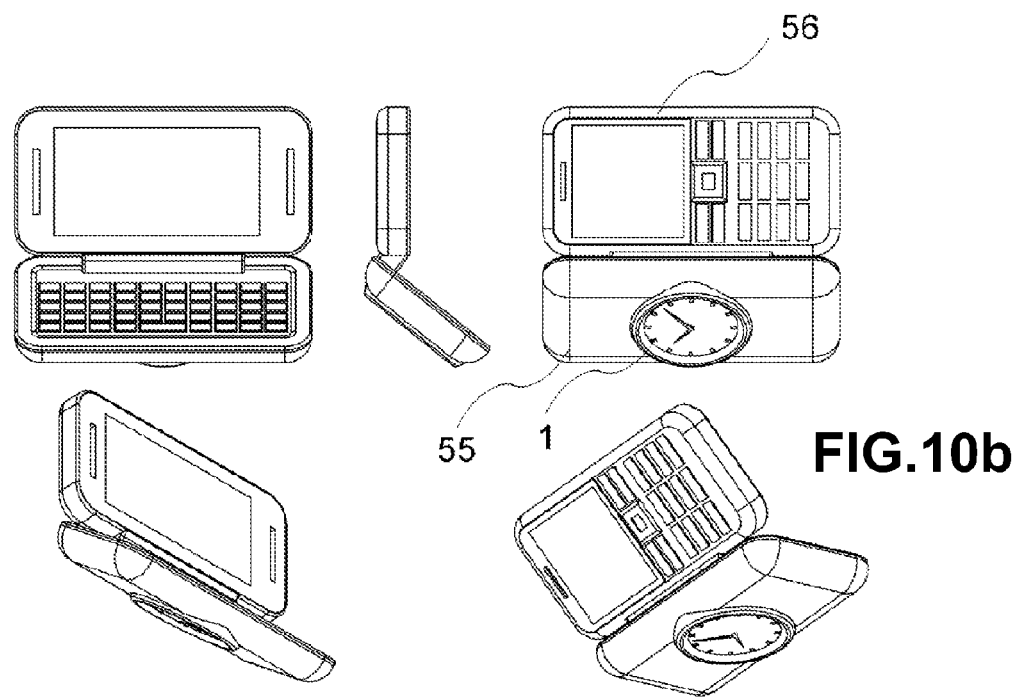

FIGS. 10a and 10b illustrate two other embodiments of a portable apparatus in accordance with the invention (personal digital assistant)—sliding and with folding flaps respectively.

DETAILED DESCRIPTION OF THE INVENTION

Although all the attached figures show a portable telephone apparatus, it should be noted that the invention applies to any type of portable apparatus endowed with a mobile telephone functionality such as a personal digital assistant (of the Blackberry or Palm type, which are both registered trademarks) or a portable mini computer, even a laptop.

Thus the mechanisms and devices illustrated in the attached figures can be taken in whole or in part to be applied to other portable apparatuses.

Figure 1A:
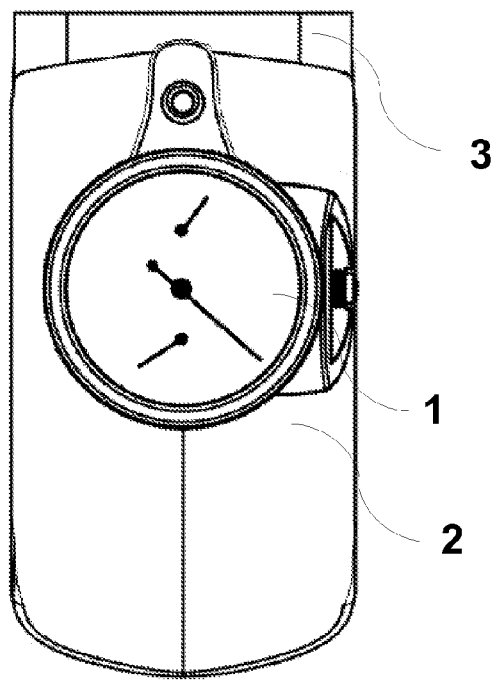
FIGS. 1a to 1c show an advantageous embodiment of the invention associating a mechanical watch with a portable flip phone. The embodiment is shown therein in its closed configuration from the front, closed configuration from the side and then in its open configuration from the side.
Figure 1B:
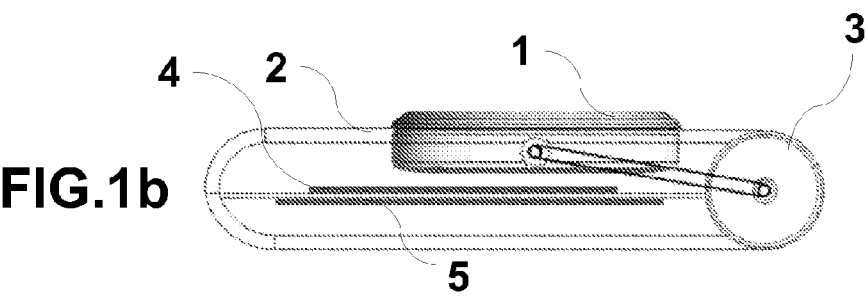
Figure 1C:
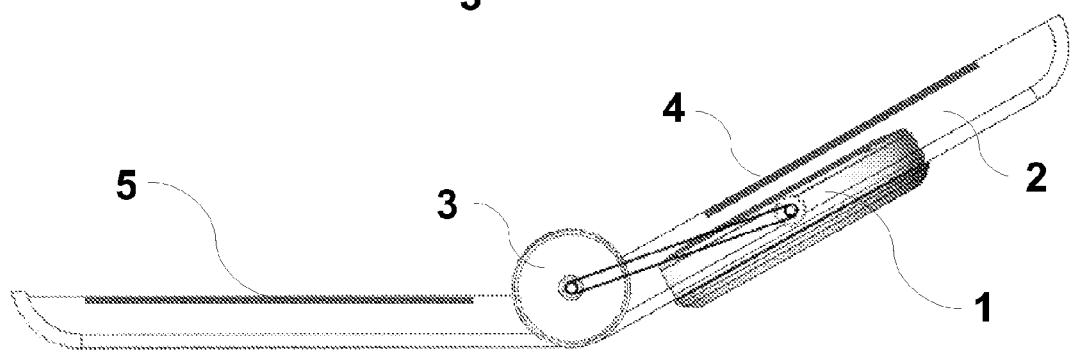

FIGS. 1a to 1c show the first advantageous embodiment of the invention. They relate to a flip phone, the telephone being shown folded up and then open.

The two-part portable telephone shown in FIGS. 1a to 1c has a mechanically wound watch (1) placed on the upper flap (2) of the apparatus. The watch thus occupies a relatively large surface and volume of the mobile phone's casing.

In order to reach the unfolded position (open configuration) the upper flap (2) of the mobile phone is a moveable element which pivots by means of a hinge (3), which makes it possible to access the functionalities of the telephone, in particular its display screen (4) and its keypad (5). Opening the flip phone generally means doubling its length and accessing both the microphone for speaking and the loudspeaker permitting the other party to be heard.

In this first embodiment of the invention, the winding mechanism of the watch is connected to the hinge enabling the portable telephone to be opened up, the winding being effected by means of a mechanical transmission device.

Thus the watch (1) is carried by an apparatus composed of two parts which can fold one onto the other, the telephone being unfoldable about an axis of rotation connected to the winding mechanism of the watch (1) and the winding being effected by means of a transmission.

It will be noted that the watch can be fixed to either of the two parts.

Figure 2A:
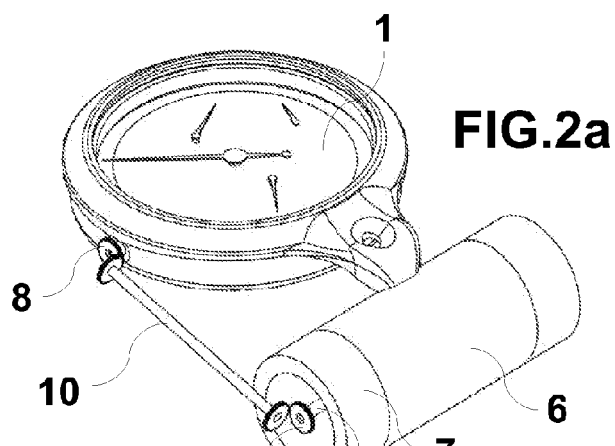
FIGS. 2a to 2c illustrate different transmission devices which can be envisaged for the winding mechanism for a watch carried by the flap of a flip phone (which is also the configuration depicted in FIGS. 1a to 1c).
Figure 2B:
Figure 2C:
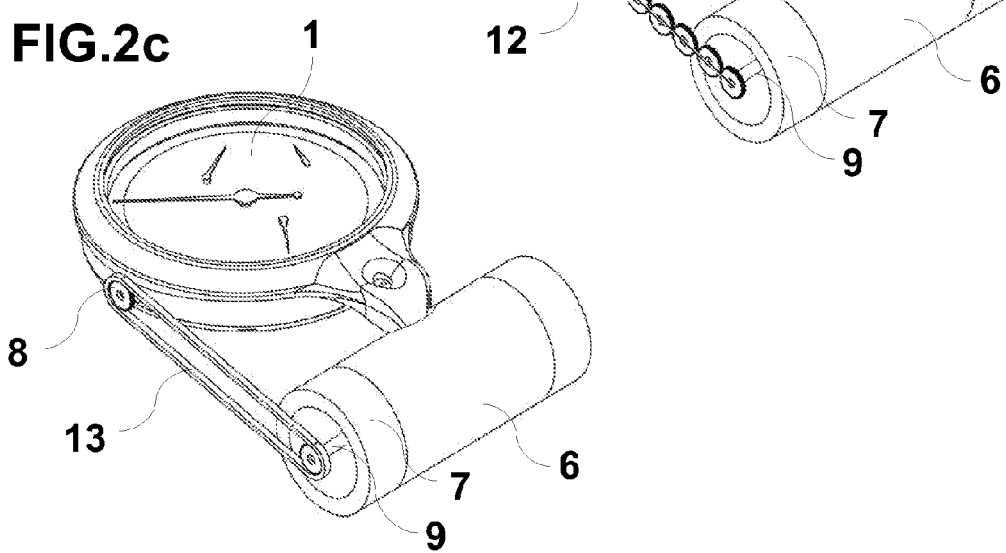

FIGS. 2a to 2c show different possible configurations for transmission of the movement between the articulation of the two parts of the telephone and the winder of the watch.

The hinge acting as an articulation between the two parts of the telephone is formed in a conventional manner by two coaxial nesting arrangements, of which one element (6) is fixedly attached to the moveable part carrying the watch (1), and a cylinder (7) is fixedly attached to the second part considered as being fixed with respect to the other because it is generally held in the hand of the user.

In order that the mechanical winding mechanism of the watch connected to the winder (8) can be actuated, a transmission is placed between the coaxial rotational spindle (9) of the articulation joining the two parts of the telephone and the winder (8).

In accordance with the invention, different transmissions are possible and three embodiments are shown in FIGS. 2*a* to 2*c*.

FIG. 2*a* illustrates a transmission using a rigid shaft (10) rotationally actuated by a toothed wheel (11) fixedly attached to the spindle (9). The rigid shaft (10) transmits the rotational movement to the winder (8) by means of another toothed wheel.

FIG. 2*b* shows a transmission produced by means of a series of pinions (12) disposed between the spindle (9) and the winder (8).

FIG. 2*c* illustrates a transmission using a belt (13) placed between a wheel fixedly attached to the spindle (9) and the winder (8).

In the three illustrations of transmissions, the act of causing the spindle (9) to rotate when opening/closing the mobile phone has the effect of driving the rotation of the transmission and the winding of the watch.

In accordance with a second embodiment of the invention the watch is carried by the lower part of a portable slide phone, the winding mechanism of the watch exploiting the sliding of the two moveable parts in order to be actuated. These two parts move in two mutually parallel planes.

Figure 3A:
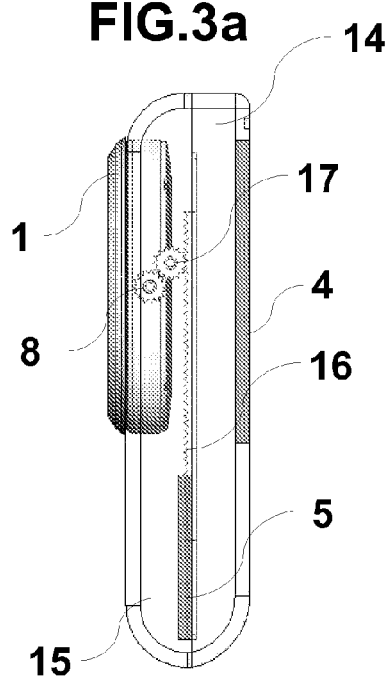
FIGS. 3a to 3c show another advantageous embodiment of the invention associating a mechanical watch with a portable slide phone. The embodiment is shown therein from the side in its closed configuration, then its open configuration and then seen in a three-quarter perspective view.
Figure 3B:
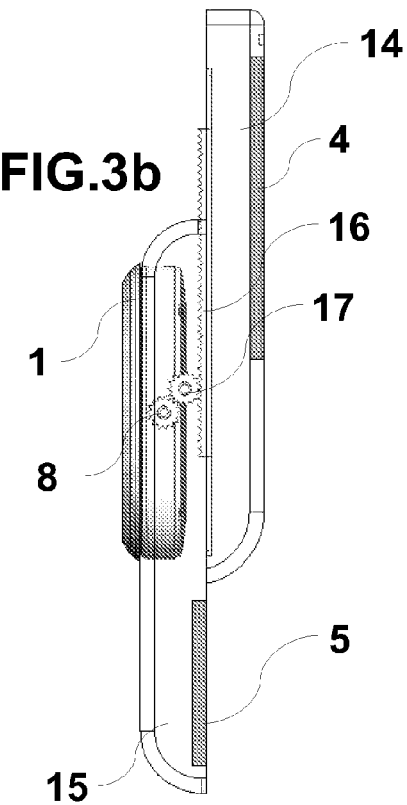
Figure 3C:
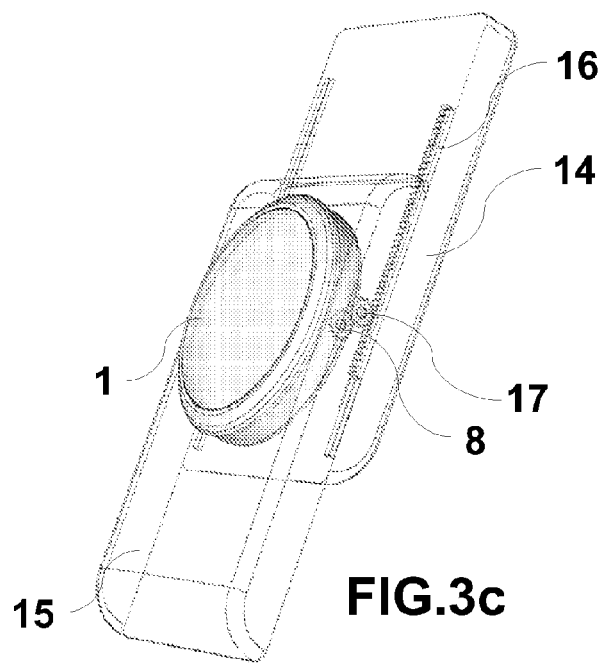

This embodiment is shown in FIGS. 3*a* to 3*c*.

The portable telephone in question here is formed by an upper part (14) (generally supporting the screen (4) of the telephone) which is able to be displaced by sliding upwards to reveal the keypad (5) of the telephone, which is generally carried by the lower part (15). The sliding of these two parts, one of which acts as a moveable element, is shown across FIGS. 3*a* and 3*b*.

In this second embodiment the watch is placed on the lower part (15) of the slide phone. FIGS. 3*a* to 3*c* show the principle of a possible mechanism for winding the mechanical watch. This has a rack (16) (placed on the upper part (14) of the mobile phone) and a set of gears (17) (placed on the lower part (15) of the mobile phone) forming a toothed wheel transmission between the winder (8) and the said rack.

According to this embodiment, when the upper part (14) is displaced in a translational manner, the toothed wheels are rotationally driven and the winder (8) is actuated.

Thus in accordance with the invention the winding mechanism for a watch placed on a telephone of the sliding type can be actuated by means of a gear train rotationally driven by the displacement of a rack carried by the upper part (14) of the telephone.

The two embodiments described above are particularly suitable for "dual body" type telephones or other portable apparatuses having the same general configuration. The watch is fixedly attached to one of the parts therein and the winding mechanism, actuated when the mobile phone is being opened and closed, bears against the articulation/connection between the parts. However, it is also feasible to position the watch on an articulation which is independent of the opening or closing of the apparatus and thus to apply the above-mentioned mechanisms to block portable apparatuses.

In accordance with a third embodiment which relates to all types of portable telephones (mono or dual body), the watch is placed in such a way that it can be displaced in a pivoting or translational manner and can do so independently of the rest of the telephone.

The advantageous implementations of this embodiment are shown in FIGS. 4*a* to 4*d*.

FIG. 4*a* shows a watch (1) placed on the upper flap (2) of a flip phone. The pivoting of the watch (1) reveals the external screen (18) of the flip phone.

FIG. 4*b* shows a watch (1) fastened, for example, to a battery compartment cover (19), the opening of which permits access to the battery pack located on the back of a block portable telephone (20).

In these two configurations the winding mechanism of the watch (1) is actuated via a device for mechanical transmission of movement associated with the hinge (21) which permits independent pivoting of the watch. This winding mechanism is actuated according to the principle of mechanical transmission previously described in relation to the first embodiment of the invention.

FIGS. 4*c* and 4*d* show the sliding of the mechanical watch (1) placed on the back of a block telephone (20) generally having a screen (4) and a keypad (5) on its main face. This sliding permits, for example, the battery pack to be revealed. In this configuration the winding mechanism is actuated according to the principle of mechanical transmission described above in relation to the second embodiment of the invention having recourse to a rack (16).

Thus in an advantageous manner according to the invention the independent sliding or pivoting of the watch with respect to the telephone, at the same time as it is involved in the winding of the watch, makes it possible to reveal a display screen, to access the battery pack, to access a telephone functionality or a functionality useful to the apparatus as a telephone, for example a battery charge indicator or indicator of connection to the mobile telephone communication network.

Similarly it is also possible that the displacement of the watch makes it possible to reveal a functionality which is not useful to the telephone. Thus the inside of the cavity in which the watch is placed in the closed configuration could, in the open configuration, allow, for example, a compass, photograph or item personalised by engraving to appear.

Still in this third embodiment, a portable telephone is also envisaged having two parts which can move with respect to each other, in which the displacement of the watch permits access to the portion of the moveable part located below the watch and on which it is not articulated, without it being necessary to unfold or slide the portable telephone.

It is also feasible in this third embodiment that, by means of its independent sliding or pivoting movement, the watch forms a removable protective means for a portion of the portable telephone, whatever type this telephone is.

In a fourth embodiment, shown across FIGS. 5*a* and 5*b*, the watch (1) is mounted on a portable telephone (22), regardless of what type it is (even though it is shown in this case on the upper flap of a flip phone). This watch is wound via the rocking of an oscillating mass (23) taking place according to the displacements imparted to the portable telephone by its user and/or during displacement by the user of a moveable part of the apparatus carrying the watch.

It will be noted that the apparatus is, for example, in two parts which can move with respect to one another.

One of the parts incorporating the watch is displaced either by unfolding (pivoting) about a hinge-forming articulation or by sliding during opening/closing of the apparatus.

During this displacement the oscillating mass is driven in motion.

The general principle of this mechanism involving an oscillating mass, traditionally referred to as "automatic winding", is well known in horology since it is widely used in wrist watches.

FIG. 5a illustrates this embodiment by showing a front view of the telephone comprising the watch (1), its oscillating mass (23) enclosed in a space provided below the watch (1) and of which the to-and-fro travel can be seen via a window (24).

FIG. 5b illustrates an internal cut-away view showing a rear view of this device. It is possible to see therein the oscillating mass (23) connected by its arm (25) to the calibre (26) of the mechanical watch. The mass moves in this case freely along an arc of circle of about 90° and its to-and-fro travel is limited by abutment-forming parts (27) disposed at the ends of the space containing the oscillating mass. Nevertheless, other embodiments could propose a greater amplitude for the travel of the mass, even proposing that it be totally free through 360°.

The traditional mechanism for automatic winding of a watch by means of an oscillating mass is well known. Traditionally in this system the oscillating mass placed at the rear of the calibre of the watch and contained in the watch casing moves freely through 360°.

The invention desires to propose in this case a relevant technical solution permitting adaptation of this oscillating mass principle to the constraints (for example, size) relating to a particular support formed by the portable apparatus such as a telephone.

In this embodiment the solution is in this case to increase the kinetic yield of the mass by weighting it and by elongating the arm (25) with respect to the device traditionally found in horology on wrist watches. Furthermore, it is possible to seek to reduce the overall thickness of the device by no longer placing the mass behind the calibre (26) but in a lateral manner with respect to the calibre by virtue of its fine elongated arm.

Each of the embodiments described above involving unfolding of a hinge or sliding, are characterised by the existence of an "open" configuration and a "closed" configuration. It should be noted that the winding mechanism of the watch linked to these embodiments is actuated in only one direction and preferentially during the action intended to move from the closed to the open configuration. In a parallel manner, the action intended to move from the open to the closed configuration involves an automatic disengagement of the winding mechanism of the watch. This disengagement is effected in the same way as in wrist watches with manual mechanical winding when the winder is actuated in the opposite direction to that provided for winding.

In relation to the fourth embodiment involving an oscillating mass, it should be noted that whatever type of movement the portable telephone—or a part thereof carrying the watch—is subjected to, and thus whatever the direction of the travel effected by the said mass, it is possible to use the kinetic energy thereof to recharge the watch.

Moreover, in order to limit the stresses which are hazardous to the watch, the apparatus in accordance with the invention has a mechanism for disengaging the winding mechanism of the watch when winding has been fully effected. A torque limiter can thus be provided in order to disengage the driving of the winder.

A number of portable apparatus variations having a mechanical watch are possible, different transmissions can be used for coupling the movement of the watch, of a part of the apparatus (for example, flap) or of the apparatus itself to its winding mechanism. The watch can be positioned on different types of apparatus, on different parts thereof and even be articulated independently of these parts, without departing from the scope of the invention.

Of course, different mechanical watches can be used, having a single dial or a plurality thereof, displaying various functionalities, presenting different complications or varied appearances, without departing from the scope of the invention.

The portable apparatus considered can comprise all the known functionalities of current apparatuses and the conventional additional options such as a camera, video camera, Internet connection, GPS, MP3 player, message receiving and sending, or others, without departing from the scope of the invention.

In a fifth embodiment shown in FIGS. 6a, 6b and 6c, the apparatus has two parts or flaps which can fold one onto the other. The watch (1) is mounted on the upper flap (2) of a flip phone provided with a hinge (3) and it is wound by the linear displacement of a mass (28) which occurs during opening and closing phases of the telephone, i.e. when the user raises or alternatively folds down the upper flap (2) of the telephone.

Indeed, it will be understood that when the telephone is being opened, the mass (28) is displaced linearly under the effect of its own weight in the guideway (29) arranged in the upper flap. This movement of the mass (28) is then converted into a rotational movement with the aid of the connecting rod (30) and the crank (31). The rotational movement of the crank (31) is then transmitted via a gear train (32) to the traditional "automatic" calibre (26) of the watch (1). The movement transmission device described above is, for example, integrated into the upper flap.

The general principle of a traditional so-called "automatic" calibre involving a moving mass is well known in horology since it is widely used in wrist watches with the difference that in these wrist watches the mass is rotationally but not translationally moveable therein.

In accordance with a variation illustrated in FIG. 6c, the connecting rod-crank pairing can be replaced by a rack system. The mass (28) is thus provided with a rack (33). During displacement of the free mass in the guide (29), the rack rotationally drives a driving pinion (34). This rotational movement is then transmitted by a gear train (32) to the traditional "automatic" calibre (26) of the watch (1).

Figure 7A:
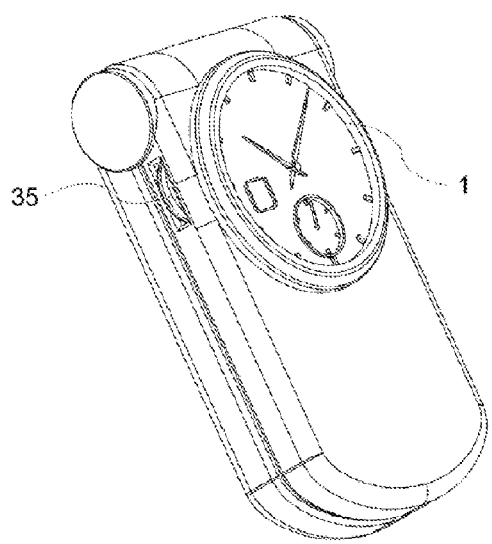
Figure 7B:
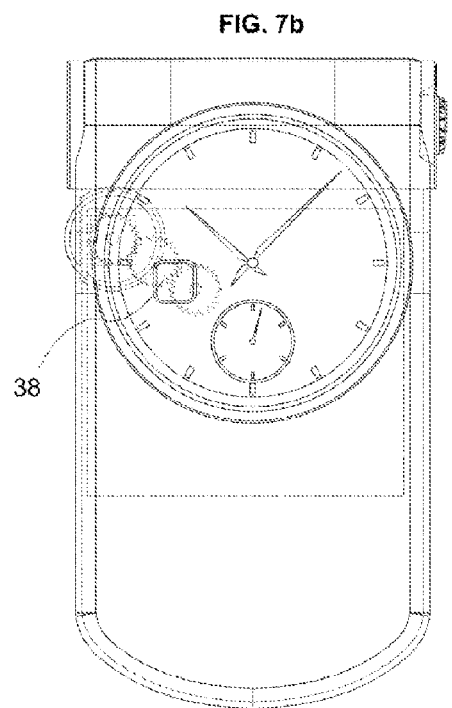
Figure 7C:
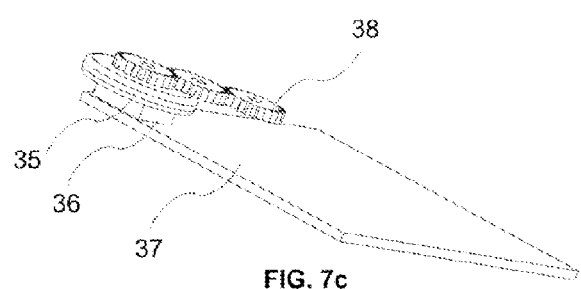
Figure 7D:
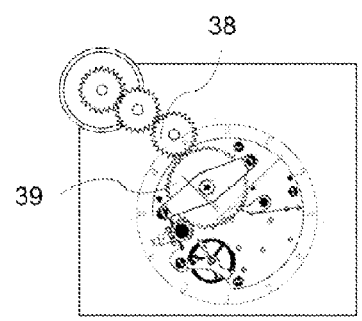

A sixth embodiment illustrated in FIGS. 7a to 7d relates to a portable apparatus which in this case has a foldable flap. However, this embodiment applies to any type of apparatus (block, sliding or flip) having a mechanical watch (1) as well as a thumbwheel (35) which can serve to control various electronic functions (such as the adjustment of the volume and/or the zoom of the video camera and/or scrolling through a list of menus etc). In a conventional manner these thumbwheels are rotated by the user of the mobile apparatus (for example, mobile telephone), this movement being transmitted to an electronic component (36) (of the encoder type, for example) which is soldered to an electronic board (37) and which sends the information in the form of electrical signals to the rest of the electronic part of the apparatus. According to this sixth embodiment, the rotation of the thumbwheel (35) (or even a plurality of thumbwheels), which may be of any form and be arranged at any location on the mobile apparatus (on any of the faces of the apparatus), is also exploited to wind the mechanical watch via a gear train (38) driving the spindle serving to wind the calibre (39) of the watch (FIG. 7d). In order not to immobilise the thumbwheel when the calibre of the watch is fully wound a torque limiter or a disengagement system is interposed at the output of the winding spindle of the watch.

It will be noted that the thumbwheel is in this case located on one of the lateral faces of the apparatus but it could, for example, be positioned on the front face of the apparatus and, when the apparatus is in two parts, on any face of one of the parts.

A seventh embodiment illustrated in FIGS. 8a and 8b relates to a portable apparatus of any type (block, sliding or flip) having a mechanical watch and a keypad with electromechanical keys (i.e. a conventional, non-tactile telephone keypad). In this embodiment, normal use of the keypad contributes to the mechanical winding of the mechanical watch. Thus when the user exerts pressure on the keys then at the same time:
- on the one hand the translational/depressing movement of the keys (40) is converted into a rotational movement by means of a cam (such as a projection located on the piece 40) and a piece (41) and,
- on the other hand the key (40) bears against the electromechanical contact (45) which is itself soldered to the electronic board (46).

When the cam is displaced downwards as the key is pressed in, the piece (41) is then rotationally driven by the movement of the cam in the groove in the piece 41 (FIG. 8b). This piece (41) also has a toothed wheel on its base, permitting transmission of its rotational movement to a gear train (44) which in turn drives the spindle serving to wind the calibre (39) of the watch.

It will be noted that the pieces (41) and (44) are mounted on a support, for example, on the piece (43) and/or the electronic board (46).

In order not to immobilise the keys when the calibre of the watch is fully wound, a torque limiter or disengagement system is interposed at the output of the winding spindle of the watch.

This relational principle between a key and the winding spindle of the mechanical watch can involve one or a plurality of keys of the keypad of the portable telephone or, more generally, the portable apparatus with a mobile telephone function.

An eighth embodiment illustrated in FIGS. 9a and 9b relates to a portable apparatus with a flap having a mechanical watch (1). The watch (1) is provided with a mechanical calibre with traditional automatic winding. The spindle (50) on which the oscillating mass of the calibre (39) is normally fixed is in this case fixedly attached to the main casing (51) of the watch, which is itself fixedly attached to the flap of the apparatus. The assembly formed by the calibre (39), the winder (47), the dial and the secondary casing (52) pivots freely through an angular range of 180° with respect to the spindle (50) (FIGS. 9b and 9c). The rotation of this assembly is due to the presence of a mass (49) on the secondary casing (52) which creates an imbalance and thus always orientates the watch in the same direction (FIG. 9a). When the telephone is being opened the imbalance causes the watch to rotate. This relative rotation of the calibre (39) of the watch with respect to the fixed spindle (50) drives the winding of the mechanical watch.

The rotation of the weighted watch about the spindle (50) is facilitated by the presence of at least one wheel (48) (two wheels disposed, for example, in a diametrically opposed manner are shown in FIGS. 9a and 9b), which makes it possible to limit the shearing forces due to the weight of the assembly on the spindle (50).

The winder (47) makes it possible to set the time on the watch and possibly to wind it manually.

In order not to immobilise the rotation of the watch when it is fully wound, a torque limiter or disengagement system is interposed at the output of the winding spindle of the watch.

As already mentioned, the invention and the various mechanisms set out above relate to portable telephones but also in a non-limiting manner to personal digital assistants, mini computers . . . .

FIG. 10a thus shows a personal assistant which slides to reveal a full keypad (for example, of the azerty type). This portable apparatus has a part (54), referred to as the upper part, having a screen (for example, a tactile screen) on its outer face and a part (53), referred to as the lower part, having on one side (on a face referred to as the inner face because it is masked by the part (54) when the apparatus is in the closed configuration) the keypad, and on the opposite side (on its opposite face, referred to as the outer face because it can be seen when the apparatus is closed) the mechanical watch (1). As for the preceding embodiments, the kinetic energy used when the parts slide with respect to each other is exploited to wind the mechanical watch (1) integrated into the apparatus.

It will be noted that it is possible, for example, to use one of the mechanisms illustrated in FIGS. 3a to 3c, 7a to 7d (if the apparatus has a rotating thumbwheel; in this case it is even possible to use the apparatus in the closed configuration if the thumbwheel is on one of the lateral flanks) or even in FIGS. 8a and 8b.

FIG. 10b illustrates a personal assistant with a flap which reveals a full keypad. This portable apparatus has a flap (56), referred to as the upper flap, comprising a screen on each of its opposing faces, and a flap (55), referred to as a lower flap, having on one side (on a face referred to as an inner face) the keypad and on the other (on an opposite face referred to as the outer face) the mechanical watch (1) integrated into the apparatus. As for the preceding embodiments, kinetic energy used during opening/closing of the apparatus, for example by pivoting the flaps with respect to each other, is exploited to wind the mechanical watch (1).

It will be noted that it is possible, for example, to use one of the mechanisms shown in FIGS. 1a to 1c, 2a to 2c, 6a to 6c, 8a and 8b, 9a to 9c.

According to one variation it is possible to exploit the displacement of another element of the apparatus to transmit the energy to the mechanical winding mechanism of the watch when the apparatus is in the closed position. Thus the rotation of a thumbwheel arranged on one of the large outer faces or small outer faces of the closed apparatus, as shown, for example, in FIGS. 7a to 7d, can be envisaged.

Of course, the invention is not limited to the embodiments described and illustrated by way of example but also includes all technical equivalents and combinations thereof.

The invention claimed is:

1. A portable apparatus having a mobile telephone function, comprising:
   - at least one watch;
   - a mechanism for mechanical winding of the watch; and
   - at least one element which can move with respect to the apparatus and which is connected to the mechanical winding mechanism by a mechanical device for transmission of movement, the kinetic energy involved during displacement of said at least one moveable element being communicated to the mechanical winding mechanism of the watch via the mechanical device for transmission of movement.

2. The portable apparatus as claimed in claim 1, wherein the displacement of said at least one moveable element is effected during at least one action of usage of the apparatus.

3. The portable apparatus as claimed in claim 2, wherein the at least action of usage of the portable apparatus is opening of a main flap or of a battery compartment cover, sliding of a screen, or access to a specific function by pivoting or sliding the watch.

4. The portable apparatus as claimed in claim 1, wherein the portable apparatus has two parts which can fold one onto the other and of which one carries the watch, opening of the apparatus taking place about an axis of rotation which forms part of the movement transmission device.

5. The portable apparatus as claimed in claim 1, wherein the portable apparatus has two parts which can move with respect to each other in two parallel planes and of which one carries the watch, the winding mechanism of the watch being actuated during sliding of the two moveable parts with respect to each other.

6. The portable apparatus as claimed in claim 5, wherein the winding mechanism is actuated by means of the movement transmission device comprising a gear train rotationally driven by displacement of a rack carried by one of the parts of the apparatus.

7. The portable apparatus as claimed in claim 1, wherein the watch is displaced alone in a pivoting or translational manner with respect to the entire apparatus.

8. The portable apparatus as claimed in claim 7, wherein the displacement of the watch is exploited mechanically to contribute to the winding of the watch via the mechanical device for transmission of movement associated with a hinge permitting the said displacement of the watch.

9. The portable apparatus as claimed in claim 8, wherein the displacement of the watch makes it possible to reveal an external screen, a battery pack or a subjacent display screen linked to a telephone functionality or to a functionality useful for the apparatus as a portable apparatus, for example a battery charge indicator or indicator of connection to a communication network.

10. The portable apparatus as claimed in claim 7, wherein the displacement of the watch makes it possible to reveal a functionality which is not useful to the telephone, within a cavity in which the watch is folded, or a compass, a photograph or an item which has been personalised by engraving.

11. The portable apparatus as claimed in claim 7, wherein the portable apparatus has two parts which can move with respect to each other, the independent displacement of the watch permitting access to a portion of a moveable part located under the watch and on which the moveable part is not articulated, without it being necessary to open the portable apparatus.

12. The portable apparatus as claimed in claim 1, wherein the mechanism for winding the watch is actuated when the said at least one moveable element is being moved into an open configuration, whether this involves, opening of the apparatus, of a flap, unfolding or sliding of the watch, but is disengaged when said at least one moveable element is being moved into a closed configuration.

13. The portable apparatus as claimed in claim 1, wherein the portable apparatus has two parts which can fold one onto the other, the movement transmission device having a linear and free mass system transferring kinetic energy used during each movement of one part to a mechanism for winding a watch movement.

14. The portable apparatus as claimed in claim 1, wherein the movement transmission device comprises an oscillating mass system transferring the kinetic energy of each displacement of the said at least one moveable element of the apparatus to a mechanism for winding a watch movement.

15. The portable apparatus as claimed in claim 14, wherein the oscillating mass is weighted and an arm connecting the mass to the winding mechanism extends outside a zone of the apparatus where the watch is arranged.

16. The portable apparatus as claimed in claim 14, wherein the oscillating mass is placed laterally with respect to the watch calibre in order to limit a thickness of the apparatus fitted with the device.

17. The portable apparatus as claimed in claim 1, wherein the portable apparatus has two parts which can fold one onto the other and of which one carries the watch, the movement transmission device having a system for full rotation of a watch movement, transferring kinetic energy used during each movement of one part to the mechanism for winding the watch movement.

18. The portable apparatus as claimed in claim 1, wherein the portable apparatus has one or a plurality of rotationally moveable thumbwheels connected to the movement transmission device in order to wind a mechanical watch.

19. The portable apparatus as claimed in claim 1, wherein the portable apparatus has one or a plurality of keypad keys, a depression of which is converted into a rotational movement by the movement transmission device in order to wind a mechanical watch.

20. The portable apparatus as claimed in claim 18, wherein the movement transmission device has a system of gears.

21. The portable apparatus as claimed in claim 1, wherein the portable apparatus has a mechanism for disengaging the winding mechanism when winding has been effected fully.

* * * * *